United States Patent
Harles et al.

(10) Patent No.: US 7,539,456 B2
(45) Date of Patent: May 26, 2009

(54) SPREAD SPECTRUM COMMUNICATION SYSTEM USING A QUASI-GEOSTATIONARY SATELLITE

(75) Inventors: Guy Harles, Fentange (LU); Gerhard Bethscheider, Ayl (DE)

(73) Assignee: SES Astra S.A., Chateau de Betzdorf (LU)

( * ) Notice: Subject to any disclaimer, the term of this patent is extended or adjusted under 35 U.S.C. 154(b) by 466 days.

(21) Appl. No.: 10/370,252

(22) Filed: Feb. 20, 2003

(65) Prior Publication Data

US 2003/0181161 A1 Sep. 25, 2003

Related U.S. Application Data

(63) Continuation of application No. PCT/EP01/11206, filed on Sep. 27, 2001.

(30) Foreign Application Priority Data

Sep. 28, 2000 (WO) .................... PCT/EP00/09520

(51) Int. Cl.
*H04B 7/185* (2006.01)
(52) U.S. Cl. .................... 455/12.1; 455/427; 455/13.2
(58) Field of Classification Search ............... 455/12.1, 455/427, 13.4, 232.1, 13.1, 429, 550, 557, 455/272; 244/176; 370/320, 342, 316
See application file for complete search history.

(56) References Cited

U.S. PATENT DOCUMENTS

| | | | |
|---|---|---|---|
| 3,829,777 A * | 8/1974 | Muratani et al. ............... 455/8 |
| 3,836,969 A | 9/1974 | Bond et al. | |
| 4,375,697 A | 3/1983 | Visher | |
| 5,379,320 A | 1/1995 | Fernandes et al. | |
| 5,625,556 A * | 4/1997 | Janky et al. ...................... 701/1 |
| 5,810,297 A * | 9/1998 | Basuthakur et al. ...... 244/158.8 |
| 5,864,579 A * | 1/1999 | Briskman .................... 375/130 |
| 5,896,368 A * | 4/1999 | Dahlman et al. ............. 370/335 |
| 5,959,592 A * | 9/1999 | Petruzzelli .................... 725/68 |
| 6,018,312 A * | 1/2000 | Haworth ..................... 342/353 |
| 6,037,911 A * | 3/2000 | Brankovic et al. .......... 343/795 |
| 6,085,067 A * | 7/2000 | Gallagher et al. .......... 455/13.1 |
| 6,212,360 B1 * | 4/2001 | Fleming et al. ............. 455/13.4 |
| 6,226,493 B1 * | 5/2001 | Leopold et al. ............. 455/13.1 |
| 6,281,853 B1 * | 8/2001 | Caille et al. ................. 343/754 |
| 6,324,159 B1 * | 11/2001 | Mennekens et al. ......... 370/203 |
| 6,327,523 B2 * | 12/2001 | Cellier ........................ 701/13 |
| 6,542,117 B1 * | 4/2003 | Broughton .................. 342/359 |
| 6,766,987 B2 * | 7/2004 | Taormina et al. ......... 244/158.4 |
| 6,831,905 B1 * | 12/2004 | Lomp et al. ................. 370/335 |
| 6,944,139 B1 * | 9/2005 | Campanella ................ 370/315 |
| 2001/0012758 A1 * | 8/2001 | Bradley et al. ............. 455/12.1 |
| 2002/0097690 A1 * | 7/2002 | Fleeter et al. ............... 370/316 |
| 2002/0168973 A1 * | 11/2002 | Dent et al. .................. 455/427 |
| 2003/0137964 A1 * | 7/2003 | Suenaga et al. ............. 370/342 |
| 2004/0110467 A1 * | 6/2004 | Wang ........................ 455/12.1 |
| 2007/0008916 A1 * | 1/2007 | Haugli et al. ............... 370/320 |

* cited by examiner

*Primary Examiner*—Tan Trinh
(74) *Attorney, Agent, or Firm*—Wolf, Greenfield & Sacks, P.C.

(57) ABSTRACT

The invention refers to a satellite communications system with a mobile user terminal. In order to provide a satellite communications system which enables communication with a mobile user terminal via conventional communication satellites on any area of interest on earth, a quasi-geostationary satellite is operated in an inclined orbit and sends a spread downlink signal s' (t) to said area of interest on earth to be received and despreaded by a mobile user terminal.

16 Claims, 8 Drawing Sheets

SPREAD SPECTRUM COMMUNICATION SYSTEM USING A QUASI-GEOSTATIONARY SATELLITE

Figure 1:
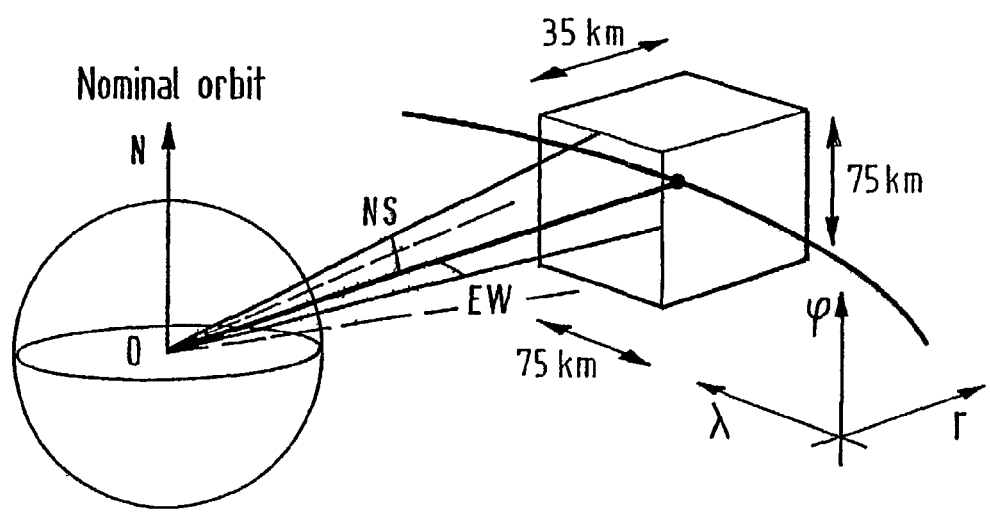

The invention refers to a satellite communications system. More particular, the invention refers to a method for illuminating an area of interest on earth with a downlink signal to be received by a mobile user terminal.

Communication satellites especially on a geostationary earth orbit (GEO) provide an effective platform to relay radio signals from an earth station to a plurality of direct-to-home (DTH) satellite dishes. A commercial satellite communication system is composed of the space segment and the ground segment. In principle, the space system of a GEO-system includes the satellite operating an orbit and a tracking, telemetry, and command (TT&C) facility that controls and manages the operation.

For the actual reception of services of the most existing geostationary satellite systems, the user needs a 50 cm dish for quasi error-free reception. When using this kind of antenna for a mobile user terminal, an automatic tracking is necessary. However, automatic tracking can only be achieved by a closed loop tracking of a beacon mounted on a satellite. Obviously, such a closed loop tracking is very expensive and may even require the use of an inertially controlled platform for the mobile antenna. Another possibility for achieving mobile communications with a geostationary satellite is the use of electronically controlled antennas. Compared with a mechanical tracking, this solution simplifies the mounting of the antenna, but still needs an expensive closed loop tracking system. Finally, in the case of a high elevation angle of the satellite, the use of fixed zenith pointing antennas which have a sufficiently large 3 dB beam width can be considered. However, this applies only to a few areas of interest on earth.

Several solutions are known to facilitate the use of a mobile receiver within a satellite communications system.

From U.S. Pat. No. 5,463,656 A it is known to use a combination of video bandwidth compression, spread spectrum waveform processing and an electronically steered, circular aperture phased array antenna to provide full broadcast quality video communications with an aircraft via a satellite communications link. A conventional geostationary satellite in Ku-band or C-band is assumed for this purpose.

From U.S. Pat. No. 6,075,969 A it is known to decrease the size of C-band or Ku-band receiving antennas within existing satellite configurations. In order to avoid unwanted interferences with other satellites, the receiving antenna is designed with nulls in orbital locations where potentially interfering satellites are located. Furthermore, spreading the bandwidth reduces the power density below the FCC limitation.

From U.S. Pat. No. 3,836,969 A it is known to operate a communications satellite in a quasi-geostationary orbit having a selected inclination relative to the equatorial plane of the earth. The inclination and orientation of the satellite is such that its inclination remains bounded by the initial value during the lifetime of the satellite so that the need of on-board north-south station keeping means is obviated. Furthermore, additional satellites are operated on inclined orbits, wherein each of the satellite orbits being progressively inclined as related to any of the other orbits and wherein a switching means performs switching from one satellite to another at selected times of the year. This disclosure considers the operation of a satellite in an inclined orbit in connection with the limited propellants of a satellite, but not in connection with mobile communications.

It is an object of the invention to provide a satellite communications system which enables communication with a mobile user terminal via conventional communication satellites on any area of interest on earth.

This object is solved by a method according to the claims 1-8 and a user terminal according to the claims 9-11.

The method for illuminating an area of interest on earth with a downlink signal comprises the steps of operating a quasi-geostationary satellite in an inclined orbit, and sending a spread downlink signal s' (t) from said quasi-geostationary satellite to said area of interest on earth.

The term of a quasi-geostationary satellite in the context of the present invention means every satellite which maintains in average its geostationary position with regard to a specific degree of longitude on earth but which is subject to perturbations due to a selected inclination relative to the equatorial plane of the earth.

Figure 2:
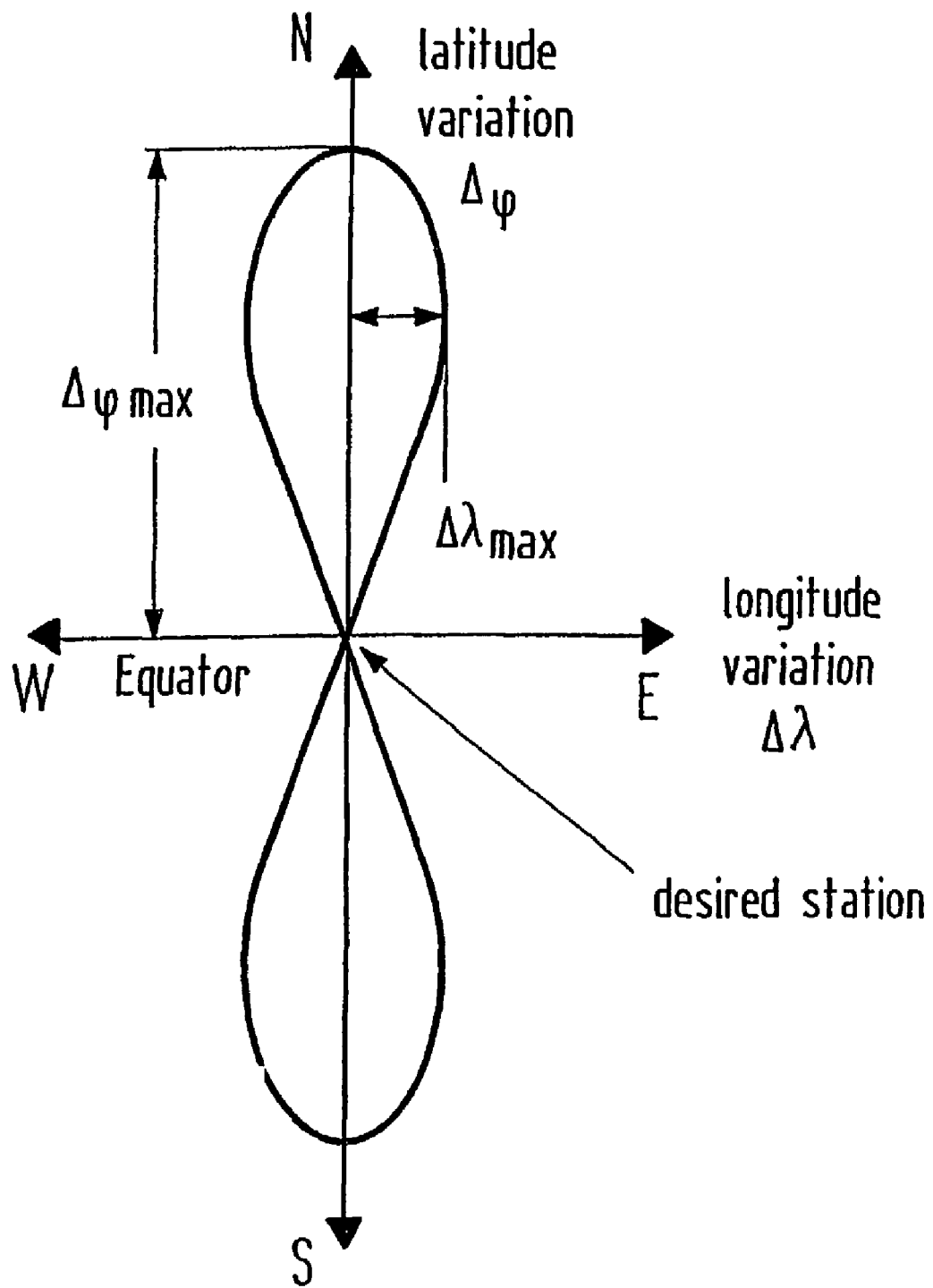

FIG. 2 shows the movement of the satellite as seen from earth stations due to a non-zero inclination, i.e. operation in an inclined orbit. The movement results in particular in a north-south oscillation of the satellite per day. Having inclinations of a few degrees, this movement is not acceptable for conventional high-bandwidth transmissions.

At first sight, the operation in an inclined orbit is not advisable for geostationary satellites because the non-zero inclination causes a figure-eight daily movement of the satellite which degrades the reception properties. However, combining the operation in an inclined orbit with spread spectrum communication leads to the advantage that the apparent daily movement enables to employ diversity concepts. Even during the unfavourable positions of the satellite with regard to the area of interest on earth, a communication is still possible due to the increased signal to noise ratio which can be achieved by spread spectrum modulation. Another advantage due to the increased signal to noise ratio is the fact that the orientation of the receiving antenna of the mobile user terminal with regard to the downlink antenna is more tolerant towards misalignments which can be caused by a movement of the corresponding vehicle.

A further advantage of the invention is the fact that the limited orbit slots for geostationary satellites can be utilised more efficiently.

Spread spectrum modulation and demodulation is a communication technique wherein the transmitted modulation is spread (increased) in bandwidth prior to transmission over the channel and then dispread (decreased) in bandwidth by the same amount at the receiver. By far the most popular spreading techniques are direct sequence (DS) modulation and frequency hopping (FH) modulation.

A direct sequence modulation is formed by linearly modulating the output sequence of a pseudo random number generator onto a chain of pulses, each having a duration called the drift time. This type of modulation is usually used together with binary phase-shift-keyed (BPSK) information signals. As such the modulated signal is formed by first multiplying (modulo-2) the pure information bit stream with the pseudo noise sequence and then modulation the phase of a clean carrier with the resulting signal.

At the receiver, either the pseudo noise waveform is already available or the receiver must first acquire the pseudo noise waveform. That is, the local pseudo noise random generator that generates the pseudo noise waveform at the receiver used for dispreading must be aligned (synchronized) within one chip of the pseudo noise waveform of the received signal. This is accomplished by employing some sort of search algorithm which typically steps the local pseudo noise waveform sequentially in time a fraction of a chip (e.g., half a chip) and at each position searches for a high degree of correlation between the received and local pseudo noise reference waveforms. The search terminates when the correlation exceeds a given threshold, which is an indication that the alignment has been achieved. After bringing the two pseudo noise waveforms into course alignment, a tracking algorithm is employed to maintain fine alignment. The most popular form of tracking loops are the continuous time delay-locked loop and its time multiplex version, the tao-dither loop.

A frequency hopping modulation is formed by non-linearly modulating a chain of pulses with a sequence of pseudo-randomly generated frequency shifts. This modulation signal is multiplied by a complex multi-frequency-shift-keyed (MFSK) information signal. At the receiver, the sum of the transmitted signal and the channel interference is complex multiplied by the identical frequency hopping modulation which returns the transmitted signal to its original MFSK form. Analogous to the direct sequence case, the receiver must acquire and track the frequency-hopped signal so that the dehopping waveform is as close to the hopping waveform as possible.

An important quality of a spread spectrum communication is the processing gain of the system which is defined by the ratio of the spread spectrum bandwidth and the bandwidth of the signal. The processing gain is a measure for diminishing the influence of interference on the receiver performance. Thereby, even if the satellite performs a movement seen from earth stations according to FIG. 2 and thus does not fulfil the requirements for a reception by direct-to-home satellite dishes using conventional modulation techniques, a reception is now possible using spread spectrum techniques.

The error probability of the received and despread payload signal p' (t) can be achieved by adjusting the spreading ration or the spread spectrum modulation accordingly. This can be done under the assumption of a given antenna gain of the antenna of said user terminal so that for typically used antennas the error probability will be sufficiently low.

Usually, the spread spectrum modulation comprises the steps of generating a pseudo noise signal PN(t) and modulating a payload signal p(t) with said pseudo noise signal PN(t) to generate said spread uplink signal s(t). Accordingly, the spread spectrum demodulation comprises the step of correlating said spread downlink signal s' (t) with said pseudo noise signal PN(t) to generate said despread payload signal p' (t).

Effectively, such correlating of said spread downlink signal s' (t) and said pseudo noise signal PN(t) is achieved by delaying said first pseudo noise signal PN(t) and multiplying the delayed first pseudo noise signal PN(t) and said spread downlink signal s' (t). The pseudo noise signal PN(t) could be a binary pseudo noise sequence which is generated by means of a feedback shift register or a memory device in which a sequence of values of a pseudo noise signal is stored.

The spread-spectrum modulation can be carried out at the earth station before transmitting the uplink signal or by on-board processing at the satellite.

The first case comprises the steps of modulating an uplink signal p(t) by spread spectrum modulation with a certain spreading ratio to generate a spread uplink signal s(t), transmitting said spread uplink signal s(t) to said quasi-geostationary satellite, and converting said spread uplink signal s(t) to said spread downlink signal s' (t).

The second case comprises the steps of transmitting an uplink signal to said quasi-geostationary satellite, on-board processing in said quasi-geostationary satellite the uplink signal by spread spectrum modulation with a certain spreading ratio to generate said spread downlink signal s' (t).

Digital on-board processing supports flexible on-board traffic routing and demand based capacity allocation. Signals are transmitted to the satellite and are received and processed by one or more satellite modules. The digital on-board processors include demodulators, demultiplexers, switches, multiplexers, modulators and traffic manager software in order to regenerate, to switch and to multiplex the data as received from the different locations. Such on-board processors are called "regenerative on-board processors" or in conjunction with multi-beam receive/transmit antennas "regenerative multi-beam on-board processors" and provide inter-beam routing functionality and fast packet switching (like ATM, IP . . . ) to support single hop interconnectivity. The following functionalities can be supported:

Combining of signals from different uplink stations/sites which are received via-multi-beam or single beam antennas from one or more satellite modules of the satellite cluster.

Data regeneration, switching and multiplexing.

Demand based capacity allocation. Also the receive coverage can be managed dynamically. The on-board processor supports full meshed connectivity, allowing to switch channels/traffic from "any site to any site" (inter-beam routing). Switching of channels and beams is therefore done on an individual basis (flexible routing).

On-board traffic management and collection of billing raw data.

On-board processor supports burst and constant bit rate applications.

Data formatting compatible with accepted downlink standards (MPEG, DVB . . . ).

Supports packet switching, circuit switching and frame switching.

Another family of on-board processors are DVB on-board processors, which re-multiplex different uplink channels into one or more DVB downlink transport streams. Uplink signals are received and routed to the on-board processor for remultiplexing and the transport streams are routed to one or more cluster satellites for their subsequent downlink.

According to another aspect of the invention, the station keeping control of said satellite is restricted to longitude drift corrections and eccentricity corrections. This feature enables to operate a satellite in an inclined orbit with a substantial reduced consumptions of the limited propellants. Although the communications equipment on the satellite represents a substantial investment, a satellite operating lifetime is typically only of the order of 12 years and is mainly limited by the availability of its propellants.

For an effective use of satellites, propellants are necessary for station keeping and stabilization. Ideally, a satellite in a geostationary orbit should remain in a fixed position because the gravitational and centrifugal forces on it are equal. Unfortunately, however, the gravitational forces on a geostationary satellite are not constant. The gravitational forces on the sun and moon on a geostationary satellite cause a change in the inclination angle of the satellite. Orbital calculations also assume that the mass of the earth is uniformly distributed in a perfect sphere. Actually, the earth is slightly egg-shaped. This error causes a change in the longitude of geostationary satellites.

The station keeping subsystem in a satellite provides small thrusters rockets that are periodically used to move the satellite back to an inclination angle of zero degrees. Furthermore, the station keeping subsystem is also used to keep geostationary satellites in their assigned longitudes. The thrusters rockets used for station keeping use gas that is stored in tanks in the satellites. Hydrazine gas is often used for the thrusters rockets on satellites. The amount of gas stored in the tanks for the thrusters rockets is one of the main limits on the effective lifetime of a geostationary satellite.

On the other hand, geostationary satellites equipped with, narrow beam antennas pointing towards specific sides on the earth require more and more precise station keeping as the beams become narrow. This precision also permits the use of ground station antennas with fixed pointing. Furthermore, the adoption of a strict station keeping tolerance for satellites permits better utilization of the orbit of geostationary satellites and the radio-frequency spectrum. Therefore, for satellites carrying high-performance satellite transponders it is aimed to have a most accurate station keeping.

FIG. 1 shows a station-keeping window with common dimensions for a geostationary satellite. As it is in practice impossible to maintain the satellite absolutely immobile with respect to the earth, the volume available for relative displacement of the satellite with respect to its original central position has got typical specifications of ±0.050° in longitude and latitude and a $4 \cdot 10^{-4}$ variation of the eccentricity. In order to keep the geostationary satellite within the station-keeping window velocity increments $\Delta v$ to the satellite are applied at a point in the orbit. These velocity increments are the result of forces acting in particular directions on the centre of mass of the satellite for sufficiently short periods compared with the period of the orbit, so that these increments can be considered as impulses. It can be shown that an impulse in $\phi$-direction modifies the inclination, an impulse in r-direction modifies the longitude and the eccentricity and an impulse in $\lambda$-direction modifies the drift and the eccentricity. Actuators are, therefore, mounted on the satellite and are capable of producing forces perpendicular to the orbit to control the inclination and tangential forces. There is no need to generate thrusts in the re-direction since a modification of the longitude is obtained from a drift created by the $\lambda$-impulses which also permit the eccentricity to be controlled. The actuators thus permit independent control of movements out of the plane of the orbit, so-called north-south station keeping, and movements in the plane of the orbit, so-called east-west station keeping.

East-west station keeping is provided by thrusts acting tangentially to the orbit in the $\lambda$-direction according to FIG. 1. It can be shown that east-west station keeping is absolutely necessary for the operation of a communication satellite because otherwise natural drift to the satellite leads to a change in the eccentricity so that the satellite no longer remains geostationary with regard to a defined position on the equator.

North-south station keeping is achieved by thrusts acting perpendicularly to the plane of the orbit thereby modifying its inclination. It can be shown that only long-term drift of the inclination vector has to be corrected since the amplitude of periodic perturbations remains less than 0.1° in latitude. The effect of the long-term drift is an inclination drift of about 0.8°-1° per year.

The overall costs of station keeping for north-south control and east-west control under consideration of the station-keeping window according to FIG. 1 is of the order of:

43-48 m/s per year for north-south control (inclination correction) and 1-5 m/s per year for east-west control (longitude drift and eccentricity corrections).

When the propellants are consumed, station keeping is no longer provided and the satellite drifts under the effect of the various perturbations. In particular, it adopts an oscillatory movement in longitude about the point of stable equilibrium which causes it to sweep a portion of space close to the orbit of other geostationary satellites. Therefore, a special procedure is adopted which aims to remove satellites from the geostationary orbit at the end of their lifetime. Using a small quantity of propellants which is reserved for this purpose the satellite is placed in a orbit of higher altitude than that of geostationary satellites. Therefore, after this operation the satellite can no longer be used for communication purposes so that all investments in the communication equipment have to be profitable within the limited lifetime of the satellite.

Since the launching of satellite began increasingly to be important ten years ago, within the next years a lot of satellite transponders have to be sorted out due to the forthcoming end of their lifetime. However, the communication transponders still could be used a few more years so that the lifetime of these satellites is firstly limited by their decreasing availability of propellants.

On the other hand, the available orbit slots in the geostationary orbit are also limited so that it is of increasing importance to operate the satellites as space-saving as possible.

Furthermore, a very important cognition is the fact that the station keeping budget for north-south control is much higher than the budget for east-west control. Therefore, it is suggested not to provide any further inclination correction by north-south control, but to restrict the station keeping control of the satellite to longitude drift and eccentricity corrections. Due to this restriction in position control there is a natural drift in the negative $\phi$-direction so that the inclination of the satellite decreases each year by approximately 0.8°.

Before restricting the station keeping control of the satellite to longitude drift and eccentricity corrections, the satellite can be positioned on a maximum permitted inclination such that the initial inclination vector is parallel to and opposed to the main direction of the natural drift. In particular, the moment for positioning the satellite on the maximum permitted inclination is chosen at the end of its lifetime before complete exhaustion of the propellant reservoirs. Without the provision of inclination correction, the inclination of the satellite decreases then approximately 0.8° per year and then reaches eventually after several years a maximum value which finally determines the end of the operational life of the satellite.

Whereas during normal operation the satellite is kept in its station-keeping window according to FIG. 1, very accurate and high-bandwidth communication is possible to ground station antennas with fixed pointing. During this phase, the utilization of the communication channel can be optimised and the investment in the equipment of the satellite is amortized in relatively short time.

However, at the end of the lifetime of the satellite, as described above, the satellite can be positioned on the maximum permitted inclination before complete exhaustion of the propellants such that the initial inclination vector is parallel to and opposed to the main direction of the natural drift, and from thereon spread spectrum communication is applied. Hence, at the end of its lifetime the satellite effectively can be used for mobile communication services which require small and non-directional antennas at the user terminal.

According to another aspect of the invention, additional satellites are operated in co-location with said quasi-geostationary satellite forming a satellite cluster. Hence, it is possible to provide two or more satellites on the inclined orbit which perform the same apparent movement with a time shift. Thus, the same orbit slot can be utilized more efficiently by a plurality of satellites.

Each satellite in said satellite cluster sends a spread spectrum downlink signal. If there is a transparent transponder in all satellites, all downlink signals could be simply the same, but which might illuminate different areas of interest on earth due to different inclined orbit positions. If there is an on-board processing in all satellites, each satellite in said satellite cluster could send a separate spread downlink signal $s_i'$ (t). Each spread downlink signal $s_i'$ (t) could be separated by its own spreading sequence with low pair-wise cross-correlation for code-division multiple access (CDMA). When using CDMA, each signal in the set is given its own spreading sequence. Therefore, all signals occupy the same bandwidth and are transmitted simultaneously in time, but are distinguished from one another at the receiver by the specific spreading code they employ. Advantageously, synchronous CDMA together with orthogonal spreading sequences is used. This means that the set of spreading sequences has relatively low pair-wise cross-correlation between any two sequences in the set. If there is a synchronous operation, it is possible to allow orthogonal sequences to be used as the spreading sequences which eliminates interference from one user to another. Therefore, if the downlink signals $s_i'$ (t) overlap in their footprint on earth, the available bandwidth can be increased. Alternately, if no effort is made to align the sequences, the system operates asynchronously which introduces multiple access interference between the channels so that the ultimate channel capacity is limited. However, the asynchronous mode might exhibit more flexibility in system design.

A mobile user terminal according to the invention comprises a mobile antenna with a low directivity, adapted to receive a spread downlink signal s' (t), which is emitted by a quasi-geostationary satellite operated in an inclined orbit, and a processing unit for demodulating said spread downlink signal s' (t) by spread spectrum demodulation.

According to one aspect of the invention, the mobile antenna is adapted to receive signals with a frequency of above 10 GHz. Usually, most of the known applications for mobile communications are based on the L-frequency band of 1.5/1.6 GHz. The advantage of those frequencies is mainly the fact of acceptable transmission properties and the suitability for satellite transmission. However, within this frequency band it is not advisable to introduce any spread spectrum technique because the resulting bandwidth is far too low for today's communication purposes. The invention, however, overcomes the prejudice that frequencies above 10 GHz are unsuitable for mobile communications due to their poor propagation properties by using a spread spectrum technique.

According to another aspect of the invention the user terminal comprises a small and mobile antenna. Another important effect of the introduced processing gain is the fact that interferences are diminished on the receiver side. Since the interference is introduced after the transmitted signal is spread, then, whereas the dispread operation at the receiver shrinks the desired signal back to its original bandwidth, at the same time it spreads the undesired signal (interference) in bandwidth by the same amount, thus reducing its power spectral density. Therefore, according to the invention, a completely new application of a communication satellite at the end of its lifetime is presented.

In particular, the antenna at the user side could be a non-directional flat antenna which could conveniently be built in in vehicles or could be integrated in computer terminals or laptops. Another possibility is to use at the user side adaptive phase array antennas based on a planar technology. Such an antenna is capable of adaptive beam forming so that it is even possible to point the main beam of the respective satellite transponder during while a vehicle is in motion so that the signals coming from orbital positions of potentially interfering satellites can be suppressed. This would reduce the amount of interfering signals considerably so that the processing gain can be decreased and a higher bandwidth of the signal can be offered. Another possibility is to use a small dish-antenna with a diameter below 10 cm which can be directed manually to the satellite.

According to another aspect of the invention, at least one additional satellite is operated in co-location with the quasi-geostationary satellite. A further cognition of the invention is the fact that this constellation can be used for providing GPS information data to the receiver. Due to improved ranging techniques, the position of a satellite can be determined nowadays with an accuracy below one meter. Hence, these coordinates of the satellites are known with the same accuracy in the earth station. In order to provide GPS information data for a mobile user terminal, each of the at least two satellites send a reference signal, wherein each reference signal comprises a reference time information and a reference orbit information with regard to the sending satellite. The processing unit of the mobile user terminal comprises a location processor for determining the coordinates of the mobile user terminal on the basis of the reference signals.

According to another aspect of the invention the spreading ratio is adjusted such that the error probability between the dispread payload signal p' (t) and the payload signal p(t) is below a required error probability under the assumption of a given antenna gain of the antenna of the user terminal. A reasonable value of the required error probability is the order to $10^{-8}$.

In order to most efficiently reach the required error probability, according to another aspect of the present invention the spread spectrum modulation and demodulation is combined with a channel encoding and decoding. A common approach of channel encoding and decoding is to periodically insert a known bit or symbol into the transmitted signal, which can be used to detect the occurrence of cycle slips and then to resolve the resulting carrier phase ambiguity.

Forward error control (FEC) coding is a further tool for achieving a good power and bandwidth efficiency. The choice of FEC coding technique is dependent on the number of bits that are to be coded as an identifiable group. First, consider the case for which only several tens of bits are to be coded into a codeword. This situation naturally arises in a number of circumstances including short data packets containing signalling information or user data, and for digital voice transmission for which additional delays (due to coding) of greater than a couple of voice frames is unacceptable and only the most sensitive bits in the frame are protected with FEC coding. For such cases a so-called BCH-code can be used. Another possibility is to use convolutional coding with puncturing to achieve the desired code rate. Usually, prior to convolutional encoding, a field of flush bits is appended to the end of the field of data bits so that the last data bits to be decoded have a similar level of integrity as the rest of the data bits. The field of flush bits can represent a significant overhead for the transmission of very short data blocks. Therefore, convolutional is preferable to block coding because it is more amenable to the use of soft decisions. Eventually, in the case of the transmission of a continuous data stream (e.g., digital voice) so-called concatenated coding with a convolutional code as the inner code and a read-salomon code as the outer code or turbo coding is used.

A suitable combination of parameters could be a BCH code, wherein the antenna gain of the antenna of the user terminal is 20 dB, the required error probability is $10^{-8}$, the chip rate is 55 Mchip/s on a 33 MHz transponder with a QPSK modulation and a carrier frequency 11 GHz in KU-band, the processing gain is 100, the coding gain is 3.5 and the information bit rate is 400 kbit/s. According to these system parameters data and/or sound programmes can be transmitted from the earth station to a user terminal. If an antenna with a higher antenna gain (e.g. adaptive phased array antenna) is used, information bit rates can be even achieved for transmitting television programmes.

It is understood that all aspects of the invention described above can be applied not only in the described combination but also in other combinations or alone.

The invention will now be described by way of an example and with reference to the accompanying drawings.

Figure 3:
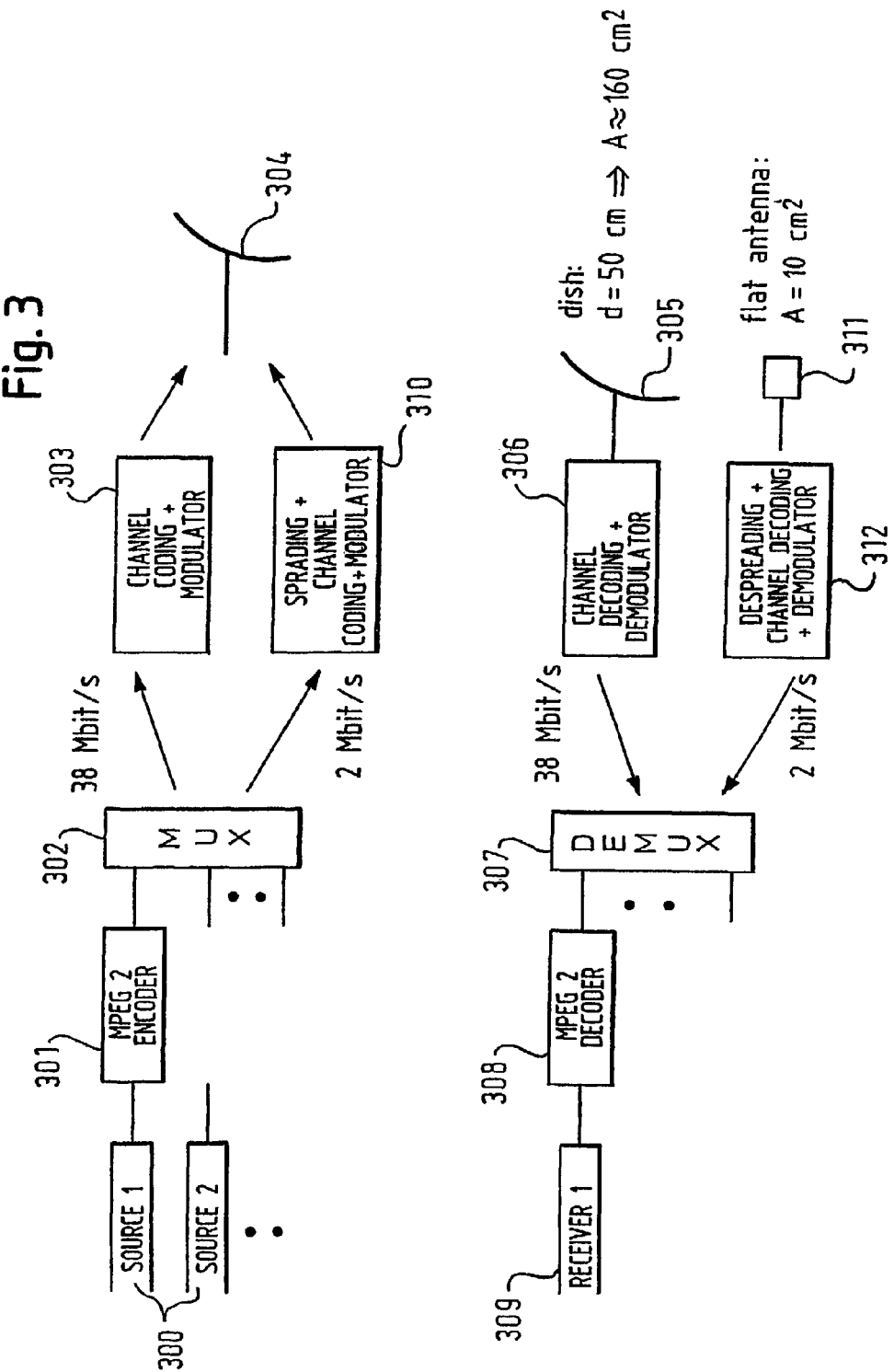
Figure 4:
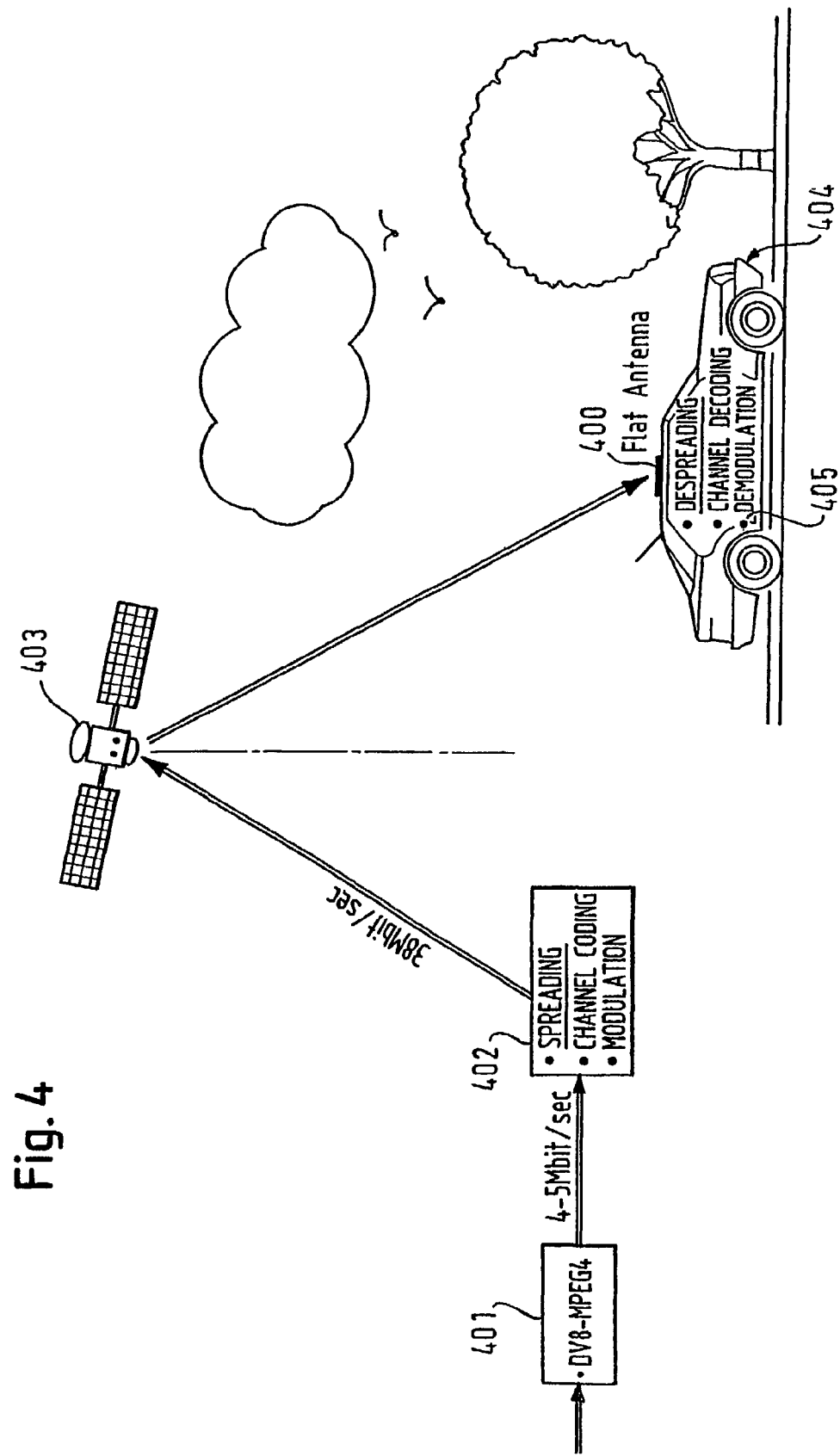
Figure 5:
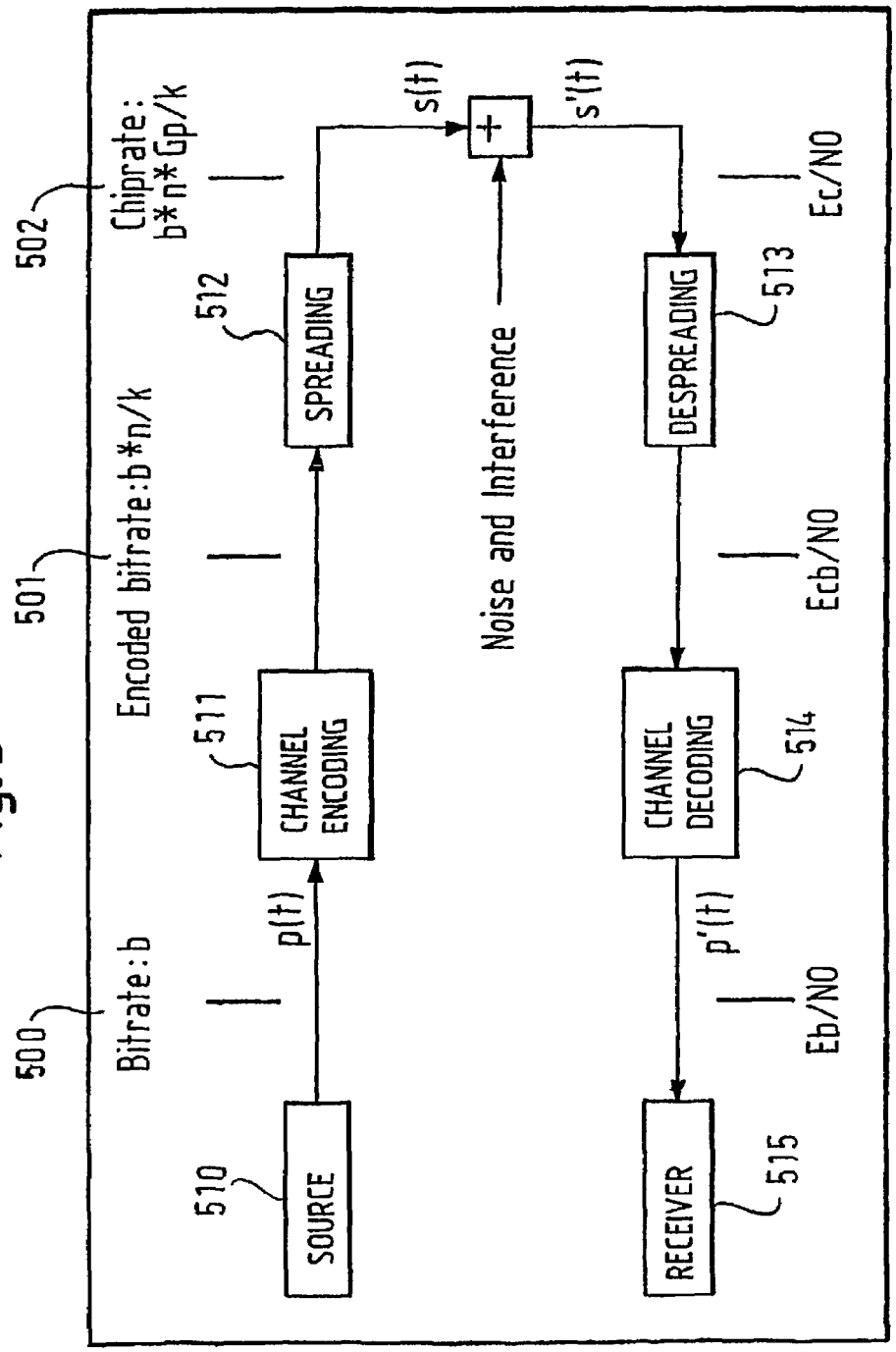
Figure 6:
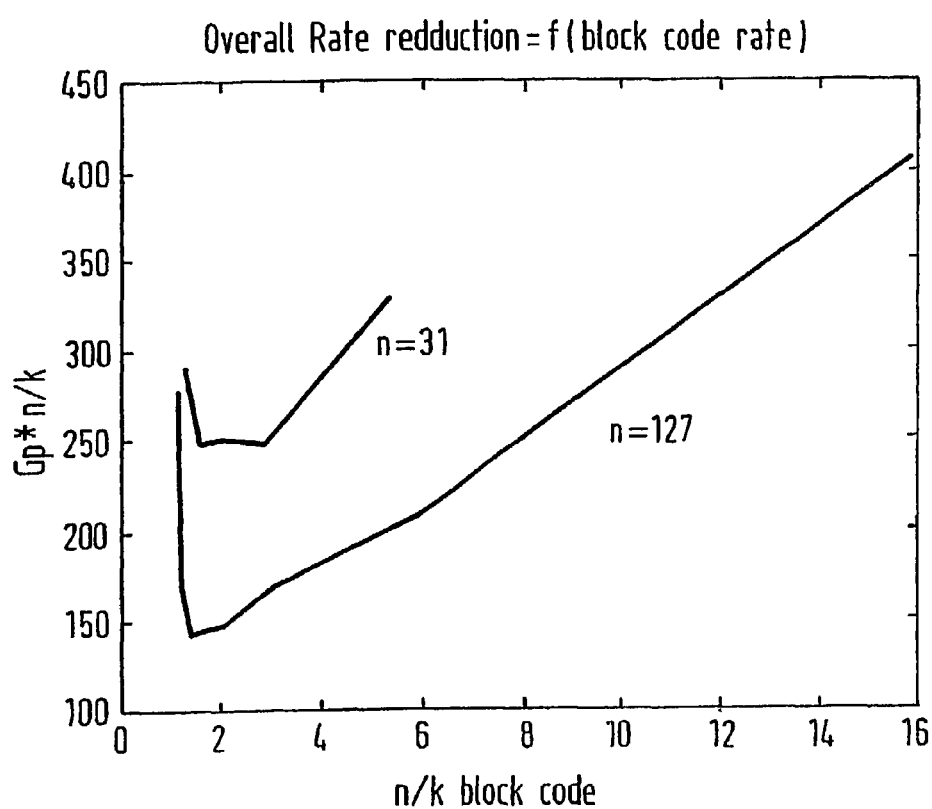
Figure 7:
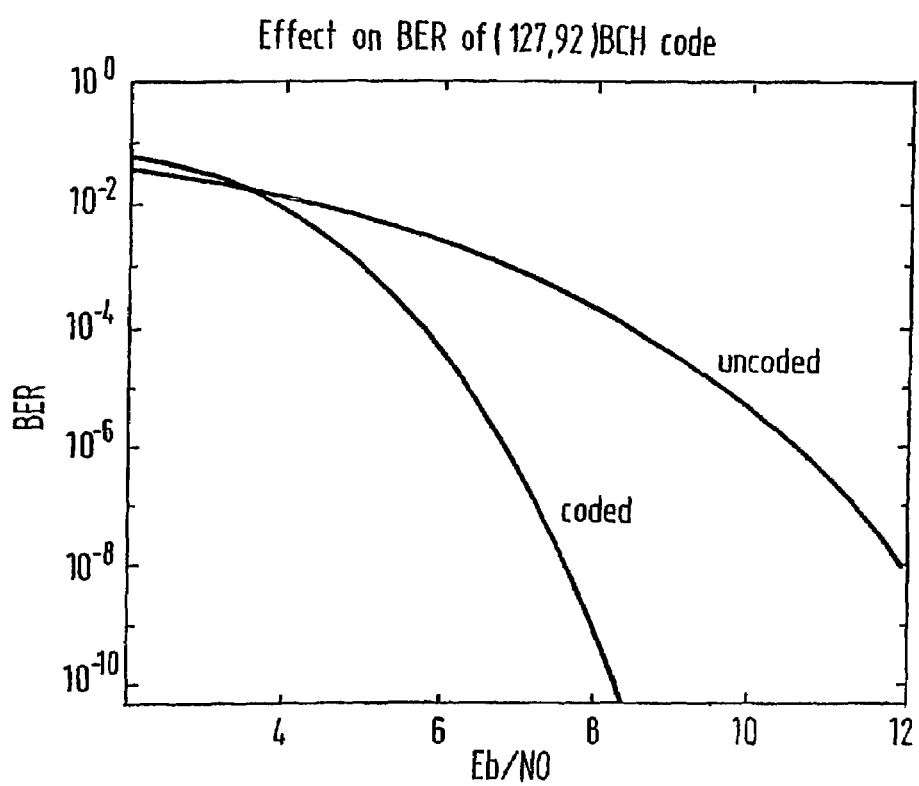
Figure 8:
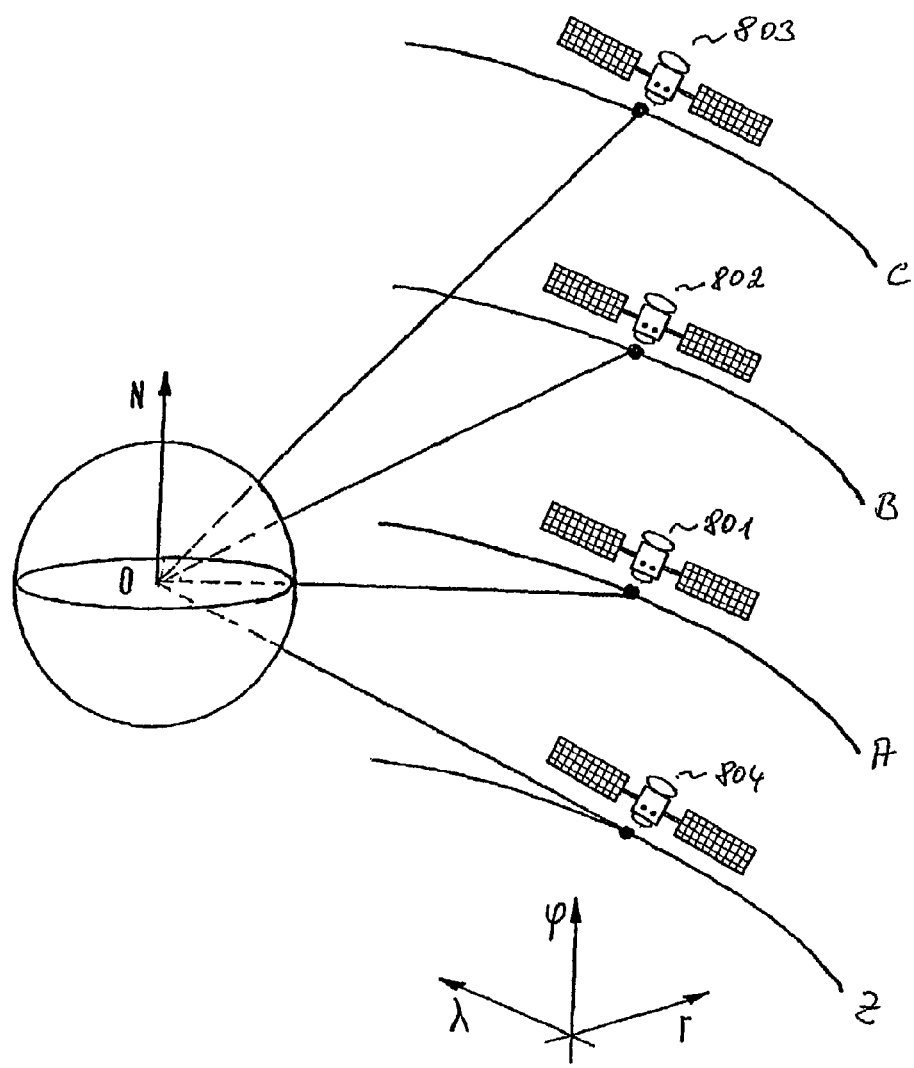

FIG. 1 shows a station-keeping window with common dimensions for a geostationary satellite, FIG. 2 shows the satellite movement due to a non-zero inclination as seen from earth stations, FIG. 3 shows the choice between a high-bandwidth transmission and a spread spectrum transmission according to the invention, FIG. 4 shows a typical application of the spread spectrum transmission during the end of lifetime of a satellite, FIG. 5 shows the combination of channel encoding and spread spectrum transmission according to the invention, FIG. 6 shows the overall rate reduction due to the introduction of channel coding depending on the code efficiency n/k, FIG. 7 shows the effect on the bit error rate due to the introduction of a BCH code depending on the signal-noise-ratio per information bit, and FIG. 8 shows a plurality of satellites operated on orbits with different inclinations.

FIG. 1 and FIG. 2 have already been described above.

FIG. 3 shows the choice between a high-bandwidth transmission and a spread spectrum transmission according to the invention. As long as there are enough propellants on board of the satellite to keep the satellite within the station-keeping window according to FIG. 1, a high-bandwidth transmission can be performed by the satellite transponder. Typically, a bandwidth of 38 Mbit/s can be provided so that several channels can be transmitted in parallel. The signals of several sources 300 are fed to a multiplexer 302. Optionally, the signals of one source can be compressed by an appropriate compression algorithm like MPEG2 for which an appropriate encoder 301 is provided. Thereafter channel coding and modulation 303 is performed before the signal is fed to the antenna 304 of the earth station. The most popular choice of modulation technique for higher rate services has been quadrature phase-shift keying (QPSK).

At the receiver side a dish with a diameter of 50 cm is provided. Accordingly, channel decoding and demodulation 306 is performed before the signal is fed to a demultiplexer 307 and is split to several receiving signals which can be received by receivers 309. In case of compression techniques a decompressor 308 is provided.

As soon as the satellite reaches its end of lifetime, according to the invention the satellite is positioned on a maximum permitted inclination such that the initial inclination vector is parallel to and opposed to the main direction of the natural drift and further north-south control is omitted. At the same time, transmission is switched over to a spread spectrum modulation 310 which results in a lower bandwidth of e.g. 2 Mbit/s. Due to the processing gain only a smaller bandwidth can be provided. However, on the other hand the requirements on station keeping of the satellite transponder and antenna gain of the receiving antenna are considerably lower in proportion as the introduced processing gain. Consequently, a flat antenna with an aperture of e.g. 10 cm² 311 for mobile communications can be provided. Corresponding dispreading 312 takes place before the signal is fed to the demultiplexer 307.

FIG. 4 shows a typical application of the spread spectrum transmission during the end of life of a satellite. This transmission corresponds to the transmission path 310, 311, 312 according to FIG. 3. An adaptive phased array flat antenna 400 might be used for increasing the antenna gain at the receiving side. On the other hand, at the sending side highly efficient compressing algorithms 401, like MPEG4 might be used. Thereby information bit rates up to 5 Mbit/s can be reached before spreading, channel coding and modulation 402. The coded signal is transmitted with 38 Mbit/s over the satellite transponder 403 and is received by the adaptive phased array antenna 400, which could be installed e.g. in a vehicle 404. At the receiving side the spreading, channel decoding and demodulation 405 takes place and, if necessary, the compression according to the compression algorithm 401.

According to the application of FIG. 1 it is thus possible to provide a transmission of TV-programmes to a mobile receiver which could be installed in a vehicle. Although the bandwidth efficiency is unacceptable, the breakeven of the investment costs for the satellite equipment still can be reached because the proposed way of transmission is provided only at the end of lifetime of the satellite.

FIG. 5 shows the combination of channel encoding and spread spectrum transmission according to the invention. In addition to adding processing gain by spread spectrum technique there is the possibility to introduce coding gain by channel coding. In this context, the following rates have to be distinguished: The highest possible rate is the chip rate 502 which has to be distinguished from the encoded bit rate 501 after channel encoding. The information bit rate delivered by the source is simply called bit rate 500.

For adding coding gain to the processing gain the following scenarios are possible:

First the information is encoded by a block (or convolution) code with the rate n/k, and only then each encoded bit is spread by the PN-sequence. This solution can be considered as a simple concatenating of spreading as inner code and block coding as outer code.

Another possibility is to first encode the information bits by a block code of very large rate. The encoded bits can then be added (modulo2) to the chips of the PN-sequence. However, in this case the PN-sequence has to be exactly of the same rate as the encoded bit rate.

According to FIG. 5 the first case of concatenating channel coding and spread spectrum is considered. A source 510 delivers a signal with a bit rate 500 which is assumed as b. Channel encoding (e.g. a BCH code) delivers an encoded bit rate 501 which results from the bit rate b multiplied with the coding efficiency n/k, wherein n stands for the number of encoded bits per codeword and k for the number of information bits per codeword. On the encoded signal then spreading 512 takes place by the processing gain Gp. While transmitting the spread signal over the satellite transponder the spread payload signal s(t) is corrupted by noise and interference so that the receive signal s'(t) is received at the user terminal. The receive signal s'(t) naturally shows a fairly poor signal-to-noise ratio Ec/N0. However, after dispreading 513 the desired signal is shrunk to its original bandwidth, whereas at the same time undesired signals are spread in bandwidth by the same amount so that an increased signal-to-noise ratio Ecb/N0 can be achieved. By channel decoding 514 further decoding gain can be introduced so that a further improved signal-to-noise ratio Eb/N0 is received by the receiver 515.

FIG. 6 shows the overall resulting rate reduction due to the introduction of channel coding depending on the coding efficiency n/k. It has to be observed that the coding gain cannot be increased just as one likes because with an increasing number of encoded bits per codeword n also the probability increases that there are distortions on the newly introduced bits. Therefore, there must be a maximum achievable bandwidth or a minimum overall rate reduction with regard to the channel bandwidth. FIG. 6 shows that for a BCH code the minimum rate reduction can be achieved for the combination n=127 and k=92, whereas for the case of n=31 the achievable minimum is more than double of the case n=127. Furthermore, it can be seen that by the introduction of channel coding an additional coding gain of almost 2 could be achieved.

FIG. 7 shows the effect on the bit error rate due to the introduction of a BCH code depending on the signal-to-noise ratio per information bit Eb/N0. For low values of Eb/N0, enhancement is not very significant, while for large Eb/N0 the difference between channel coding and no channel coding is significant. Below a certain threshold of about 4 dB channel coding is even less efficient than not coding at all. However, this case should be avoided by choosing a sufficient processing gain.

FIG. 8 shows a plurality of satellites operated on orbits with the same longitude but with different inclinations. ($\phi$, r, $\lambda$ are the stationary coordinates within each satellite, wherein $\phi$ is the latitude, r is the eccentricity and $\lambda$ is the longitude of the corresponding satellite. Satellite 801 is operated on a normal orbit A with zero inclination. Satellites 802, 803 are operated in inclined orbits B and C with positive inclination, whereas satellite 804 is operated in an inclined orbitD with negative inclination. With help of FIG. 8, some possible satellite configurations according to the invention will be described.

Embodiment 1

One Satellite in Inclined Orbit

First, the case of just one satellite in inclined orbit is considered, e.g. satellite 802 on orbit B. Having this inclination, the satellite as seen from the earth performs a movement as shown in FIG. 2. The movement results in particular in a north-south oscillation of the satellite per day. Usually, this figure-eight daily movement of the satellite degrades the reception properties of a mobile user terminal. However, the invention makes it possible to fully utilize the satellite 802 for mobile communications purposes by providing a spreaded downlink signal.

An important quality in this connection is the processing gain of the system which is defined by the ratio of the spread spectrum bandwidth and the bandwidth of the signal. The processing gain is a measure for diminishing the influence of interference on the receiver performance. Thereby, even if the satellite performs a movement seen from earth stations according to FIG. 2 and thus does not fulfil the requirements for a reception by direct-to-home satellite dishes using conventional modulation techniques, a reception is now possible using spread spectrum techniques.

The error probability of the received and despread payload signal p' (t) can be achieved by adjusting the spreading ratio or the spread spectrum modulation accordingly. This can be done under the assumption of a given antenna gain of the antenna of said user terminal so that for typically used antennas the error probability will be sufficiently low.

However, even when using a high processing gain it can never be ensured that complete transmission takes place, because the receiver is supposed to be a mobile user terminal. In particular, fading due to high buildings, tunnels and high mountains has to be considered. Besides the diversity effect due to the apparent movement of the satellite in the inclined orbit, it is possible to diminish fading effects by interleaving and buffering.

Once, a real-time data stream (e.g. video) is started on the consumer's monitor, the data has to be supplied at a constant rate. However, the system can control when the first block of the stream is delivered to the consumer's monitor (latency). Buffering can be used effectively to control the latency of delivery in video-on-demand applications. The more the data is buffered, the greater the stream startup latency, and the longer the time to serve a request block at the server. Advantageously, the diversity effect due to the apparent movement of the satellite in the inclined orbit can be combined with a repeated transmission of the same data streams.

Another possibility to cope with fading effects is to provide an interleaved spread downlink signal s' (t) which is de-interleaved prior of demodulating. The interleaving separates burst errors and making them appear more random, so that the likelihood of accurate decoding is increased. It is generally sufficient to interleave several block lengths of a block-coded signal or several constraint lengths of a convolutionally encoded signal. Block interleaving is the most straight forward approach, but delay and memory requirements are halved with convolutional and helical interleaving techniques. Periodicity in the way sequences are combined is avoided with pseudo random interleaving. The principle of interleaving in combination with spread spectrum modulation enables mobile communications via geostationary satellites even at a very high bandwidth. It is even possible to broadcast video programmes, if a certain time delay is acceptable and if forward storing is applied.

The advantages of the invention will become now fully apparent by the following embodiments which show preferred combinations with the first embodiment.

Embodiment 2

Geostationary Satellite in Combination with Embodiment 1

In addition to the satellite 802 operated on orbit B it is now assumed, that the geostationary satellite 801 with fixed position and fixed antenna pointing is operated on orbit A. It is obvious, that satellite 801 can be operated in a conventional manner with high-bandwidth transmissions. The advantage according to the invention is the fact, that in addition to satellite 801 satellite 802 can be provided for mobile communications as described above under embodiment 1. This means, that the limited orbit space can be better utilised.

Embodiment 3

Several Satellites in Inclined Orbits for GPS

The GPS (Global Positioning System) has been coordinated by the U.S. Department of Defense and provides the users with accurate timing and ranging information. The system is available with reduced accuracy to civilian users.

For specific applications it might be useful to have an alternative GPS system available, e.g. for redundancy reasons. Such a system can be easily realised having several satellites in inclined orbits.

The basic technique for determining the GPS coordinates of a receiver is based on a trilateration solution as described below. For example, three satellites are located, wherein the positions of each satellite are known. If the distances d1, d2 and d3 from each satellite to the receiver can be measured, then the unknown position of the receiver can be determined. Let $d_i$ denote the distance of the corresponding measurement of each satellite and let (x, y, z) and ($x_i$, $y_i$, $z_i$) denote the Cartesian coordinates of the receiver and each satellite $P_i$, respectively. Then the following relation holds:

$$d_i = \sqrt{(x-x_i)^2 + (y-y_i)^2 + (z-z_i)^2} - \sqrt{(x-x_0)^2 + (y-y_0)^2 + (z-z_0)^2} \quad (1)$$
$$= f_i(\vec{q}),$$
$$i = 1, 2, 3$$

where $\vec{q} = [x, y, z]^T$ is the unknown position vector of the receiver. The vector of the distance measurements is expressed as:

$$\vec{d} = \vec{f}(\vec{q}) \quad (2)$$

A commonly employed method to solve for q in this non-linear equation is the Gauβ-Newton iterative method. The best estimate of $\vec{q}$ is iteratively approximated as:

$$\hat{\vec{q}}_{k+1} = \hat{\vec{q}}_k + \left(\vec{F}^T \vec{F}\right)^{-1} \vec{F}^T \left(\vec{d} - \vec{f}(\hat{\vec{q}}_k)\right) \quad (3)$$

where $\vec{F}$ is the Jacobian matrix:

$$\vec{F} = \frac{\partial \vec{f}}{\partial \vec{q}} = \begin{bmatrix} \frac{\partial f_1}{\partial x} & \frac{\partial f_1}{\partial y} & \frac{\partial f_1}{\partial z} \\ \frac{\partial f_2}{\partial x} & \frac{\partial f_2}{\partial y} & \frac{\partial f_2}{\partial z} \\ \frac{\partial f_3}{\partial x} & \frac{\partial f_3}{\partial y} & \frac{\partial f_3}{\partial z} \end{bmatrix} \quad (4)$$

However, in practice not only a trilateration configuration, but any other configuration like e.g. a bilateration or a quadrilateration configuration can be used.

If the clock bias of the receiver is also unknown, a quadrilateration configuration is needed. Consequently, all four satellites must be visible from the receiver. In case the clock bias can be eliminated somehow, a trilateration configuration is sufficient. A bilateration configuration might even apply, if a further coordinate of the receiver is already available, which might be e.g. the height above see level.

In order to perform the distance measurements $d_i$, the corresponding satellites involved in the GPS configuration have to send a reference signal with a reference time information. Thereupon, the propagation time and thus the distances $d_i$ can be calculated. In principle, there are two possibilities to provide the reference signal, namely either by a transparent satellite transponder or by on-board processing.

Having a transparent transponder on all satellites involved in the GPS configuration, a corresponding uplink signal containing the reference signals will be relayed simultaneously by all transponders. A separation at the receiver can be achieved e.g. if the transponder show a different frequency shift in the downlink.

On-board processing as described above leave a plurality of options open for sending the reference signals to the receiver. Since a time synchronisation on the basis of the common uplink signal is difficult to realise, is also possible to achieve a time synchronisation among all satellites involved in the GPS configuration by a inter satellite communication. Once a time synchronisation among the satellites is thus achieved, the reference signals can be sent separately by each satellite, e.g. by making use of a CDMA scheme as described in detail above.

What is claimed:

1. Method for sending a downlink signal to a mobile antenna with a low directivity within an area of interest on earth, comprising the steps of:
   operating a satellite as a quasi-geostationary satellite in an inclined orbit having an inclination outside the typical specification of ±0.05° in latitude with regard to the zero inclination of the station-keeping window, and
   sending a spread downlink signal from said quasi-geostationary satellite to said area of interest on earth, wherein the spread downlink signal permits communication from the quasi-geostationary satellite, due to the high signal-to-noise ratio of spread spectrum modulation, that is not possible with a high bandwidth transmission used in a geostationary orbit.

2. Method according to claim 1, wherein said spread downlink signal has a frequency of above 10 GHz.

3. Method according to claim 1, farther comprising the steps of modulating an uplink signal by spread spectrum modulation with a certain spreading ratio to generate a spread uplink signal, transmitting said spread uplink signal to said quasi-geostationary satellite, and converting said spread uplink signal to said spread downlink signal.

4. Method according to claim 1, comprising the steps of transmitting an uplink signal to said quasi-geostationary satellite, on-board processing in said quasi-geostationary satellite the uplink signal by spread spectrum modulation with a certain spreading ratio to generate said spread downlink signal.

5. Method according to claim 1, wherein the station keeping control of said satellite is restricted to longitude drift corrections and eccentricity corrections.

6. Method according to claim 1, wherein additional satellites are operated in co-location with said quasi-geostationary satellite forming a satellite cluster.

7. Method according to claim 6, wherein each satellite in said satellite cluster sends a separate spread downlink signal.

8. Method according to claim 7, wherein each spread downlink signal is given its own spreading sequence with low pair-wise cross-correlation for code-division multiple access (CDMA).

9. Method according to claim 6, wherein at least two satellites of said satellite cluster send a reference signal, wherein each reference signal comprises a reference time information and a reference orbit information with regard to the sending satellite.

10. Method according to claim 1, wherein the spread downlink signal has a spreading ratio which is adjusted in combination with a channel coding such that the error probability of the despread and decoded downlink signal will be sufficiently low under the assumption of a given antenna gain of the adaptive phase array antenna.

11. Method according to claim 10, wherein the error probability to be achieved is in the order of $10^{-8}$.

12. Mobile user terminal, comprising:
    a mobile antenna with a low directivity, adapted to receive a spread downlink signal which is emitted by a satellite operating as a quasi-geostationary satellite in an inclined orbit having an inclination outside the typical specification of ±0.05° in latitude with regard to the zero inclination of the station-keeping window, and a processing unit for demodulating said spread downlink signal by spread spectrum demodulation, wherein the spread downlink signal permits communication from the quasi-geostationary satellite, due to the high signal-to-noise ratio of spread spectrum modulation, that is not possible with a high bandwidth transmission used in a geostationary orbit.

13. Mobile user terminal according to claim 12, wherein the mobile antenna is adapted to receive signals with a frequency of above 10 GHz.

14. Mobile user terminal according to claim 12, wherein the mobile antenna with a low directivity is a non-directional flat antenna.

15. Mobile user terminal according to claim 12, wherein the mobile antenna with a low directivity is an adaptive phase array antenna based on a planar technology and capable of adaptive beam forming.

16. Mobile user terminal according to claim 12, wherein the mobile antenna is adapted to receive reference signals sent from the quasi-geostationary satellite and at least another satellite operated in co-location with the quasi-geostationary satellite, wherein each reference signal comprises a reference time information and a reference orbit information with regard to the sending satellite and wherein the processing unit comprises a location processor for determining the coordinates of the mobile user terminal on the basis of the reference signals.

* * * * *